United States Patent
Fay et al.

(10) Patent No.: US 6,294,491 B1
(45) Date of Patent: *Sep. 25, 2001

(54) LIGHTWEIGHT GLASS FIBER INSULATION

(75) Inventors: Ralph Michael Fay, Lakewood; Jeffrey Canon Townsend, Highlands Ranch; Foster Laverne Harding; Jon Frederick Bauer, both of Castle Rock; Harry Hand Russell, III, Evergreen; Xiaojie Xu, Littleton, all of CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/311,511

(22) Filed: May 13, 1999

Related U.S. Application Data

(63) Continuation-in-part of application No. 08/827,571, filed on Mar. 28, 1997, now Pat. No. 5,945,360.
(60) Provisional application No. 60/109,480, filed on Nov. 23, 1998.

(51) Int. Cl.$^7$ .............................. C03C 13/00; C03C 13/06
(52) U.S. Cl. ........................... 501/35; 501/36; 428/295.1; 428/295.7; 428/364; 428/375; 428/378
(58) Field of Search .................................... 428/364, 375, 428/378, 295.1, 295.7; 501/35, 36

(56) References Cited

U.S. PATENT DOCUMENTS

| | | | | |
|---|---|---|---|---|
| 3,853,569 | * | 12/1974 | Laurent et al. | 501/35 |
| 3,919,134 | * | 11/1975 | Higginbottom | 428/290 |
| 5,108,957 | * | 4/1992 | Cohen et al. | 501/35 |
| 5,169,700 | | 12/1992 | Meier et al. . | |
| 5,401,693 | * | 3/1995 | Bauer et al. . | |
| 5,612,405 | * | 3/1997 | Bainbridge et al. | 524/510 |
| 5,658,836 | * | 8/1997 | Rapp et al. | 501/36 |
| 5,945,360 | * | 8/1999 | Harding et al. | 501/36 |
| 5,968,648 | * | 10/1999 | Rapp et al. | 428/357 |

* cited by examiner

*Primary Examiner*—Karl Group
(74) *Attorney, Agent, or Firm*—Robert D. Trouslee

(57) ABSTRACT

An insulation product especially suited for use as an aircraft insulation includes a blanket of randomly oriented entangled glass fibers bonded together by a thermosetting binder and having a mean diameter of about 1+/−0.25 microns. The blanket has a density between about 0.25 and about 1.5 pounds per cubic foot and a thickness between about 0.35 inches and about 2.0 inches. The blanket, exclusive of anything else, has an average machine direction tensile strength of at least 0.6 pounds/inch of blanket width and an average cross machine direction tensile strength of at least 0.3 pounds/inch of blanket length; a transverse airflow resistance between about 300 Rayls and about 1800 Rayls; and a thermal conductivity equal to or less than about 0.32 BTU-in/hr-ft$^2$-° F. The glass fibers of the blanket have a biodissolution rate in excess of 150 ng/cm$^2$/hr.

30 Claims, 1 Drawing Sheet

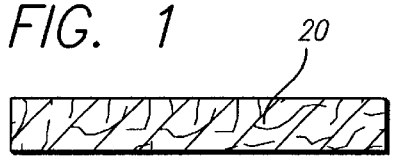
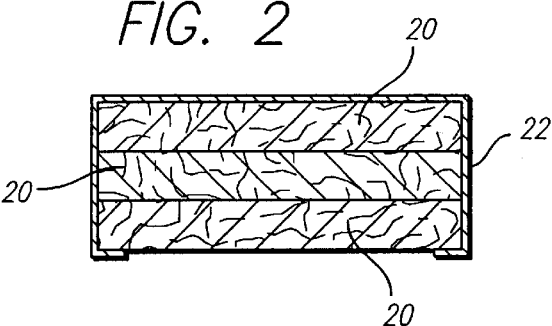
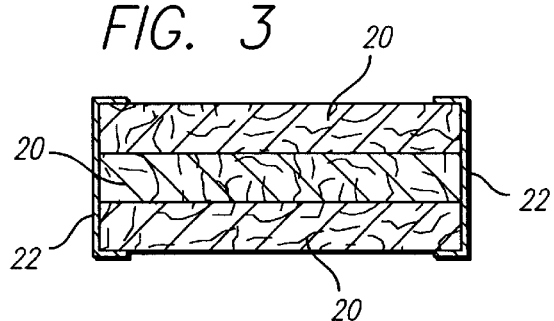
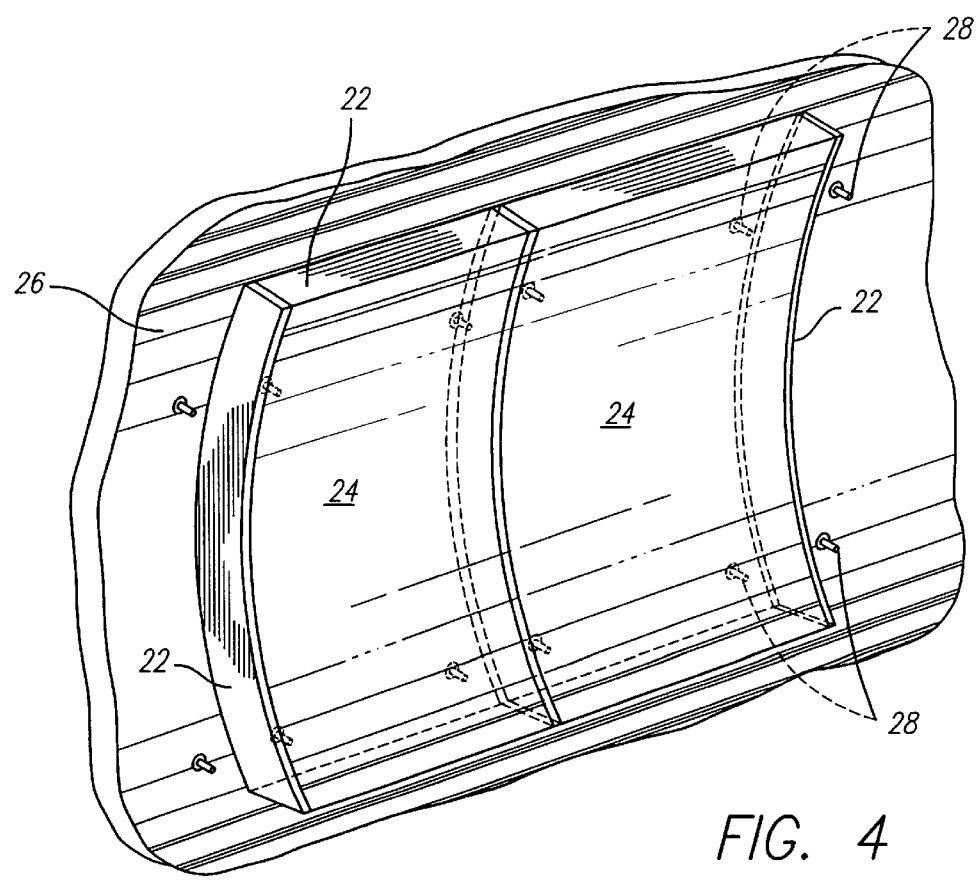

LIGHTWEIGHT GLASS FIBER INSULATION

This case is a continuation-in-part application of patent application Ser. No. 08/827,571, filed Mar. 28, 1997, now U.S. Pat. No. 5,945,360 and of provisional application 60/109,480, filed Nov. 23, 1998.

BACKGROUND OF THE INVENTION

The present invention relates to a fibrous insulation material and, more specifically, to a lightweight fibrous insulation material especially suited for use as an aircraft insulation that meets or exceeds intertracheal biopersistance and carcinogenic product liability regulations established by the European Union and generally provides better acoustical and thermal performance at any given thickness than prior fibrous insulation products used for such applications, such as the prior art products discussed below.

Fibrous insulation products are available in various densities for use in a variety of different applications. One such product is a glass fiber blanket used to insulate structures which require a high degree of insulation, such as aircraft hulls. For such an application it is important to provide an effective barrier to sound and heat transmission through the aircraft hull while keeping the weight of the insulation product at a minimum to avoid adding unnecessarily to the weight of the aircraft.

In the past fibrous insulation products were used which included glass fibers bonded together to form a blanket having a density ranging from about 0.3 to about 1.5 pounds per cubic foot (pcf). Depending on the dimensions of the space being insulated, either a single blanket or several stacked blankets wrapped and secured within a film, e.g. by sewing or heat sealing, were attached to the fuselage of the aircraft by pins secured to a skin of fuselage. In addition to holding the wrapped insulation in place, the pins prevented the insulation blankets from shifting with respect to each other. However, due to the fragile nature of the insulation, a great many pins were required to satisfactorily hold the blankets in place. For example, it was not uncommon for as many as 10,000 pins to be used in the installation of the insulation in an aircraft fuselage. The use of such a large number of pins in the insulation installation was not only time consuming, but the cost of the pins added significantly to the cost of installation. In addition, the pins compressed the insulation in the areas adjacent the pins thereby reducing the sound and heat insulative properties of the insulation.

While such insulation products performed their insulating functions satisfactorily, other characteristics of these products also proved to be a problem. For example, although the low density lightweight construction of these blankets made these blankets suitable as insulators, the low physical properties of these blankets made these blankets very susceptible to damage while being handled. In particular, the relatively low tensile strengths of these insulation products offered little tear resistance to the stresses encountered by the products during fabrication and installation, especially, in applications where the product were placed under tension by being wrapped about a structure. In addition, the normal handling of these insulation products as individual layers or in the fabrication of multilayered products, frequently tore or otherwise damaged the insulation products due to their relatively fragile nature and the wrapping of these products in a film frequently reduced the insulative properties of the product due to the condensation of water vapor trapped within the wrapped insulation.

The above described insulation products have been replaced by an insulation product which has improved tensile strength without adding significantly to the cost or weight of the product and which has eliminated the condensation problems associated with the above described insulation products. This insulation product (described in U.S. Pat. No. 5,169,700, issued Dec. 8, 1992, hereinafter "the '700 patent") includes a lightweight fibrous insulation blanket having a density range of 0.2 to 1.5 pcf and a thickness in the range of ⅜ inch to 2 inches; and an air permeable facing sheet bonded to one or both major surfaces of the blanket. The fibers of the blanket are bonded together and the facing sheet or sheets are bonded to the major surface or surfaces of the blanket by a thermosetting binder.

SUMMARY OF THE INVENTION

The insulation product of the present invention, which is also especially suited for use as an aircraft insulation, is an improvement over both of the above described lightweight insulation products. The lightweight insulation product of the present invention possesses the required integrity and tensile strengths without the need for a facing sheet, such as woven or nonwoven organic or inorganic scrim as used in the lightweight insulation of the '700 patent, as well as improved acoustical properties (air flow resistance) and thermal conductivity properties for a given density relative to the fibrous blankets of the '700 patent. The lightweight insulation product of the present invention includes a blanket of randomly oriented entangled glass fibers bonded together by a thermosetting binder (preferably a phenolic binder). The fibers have a mean diameter of about 1+/−0.25 microns. The blanket has a density between about 0.25 and about 1.5 pounds per cubic foot and a thickness between about 0.35 inches and about 2.0 inches. The blanket, exclusive of anything else, has an average machine direction tensile strength of at least 0.6 pounds/inch of blanket width and an average cross machine direction tensile strength of at least 0.3 pounds/inch of blanket length; an airflow resistance between about 300 Rayls and about 1800 Rayls; and a thermal conductivity equal to or less than about 0.32 BTU-in/hr-ft$^2$-° F.

In addition to the above, the glass fibers of the blanket have a biodissolution rate in excess of 150 ng/cm$^2$/hr. The manufacture and/or subsequent handling of fibrous insulation products may result in the formation of loose fibers which can be inhaled. As it is impractical or impossible to remove such fibers from the body, it is important to make fibrous insulation products from glass fibers having a high degree of biosolubility, i.e. fibers which are rapidly solubilized in biological fluids. The fibers used in the preferred embodiments of the present invention possess such properties and preferably, are made from a glass composition that can be fiberized by a flame attenuation processes and still retain a biodissolution rate in excess of 150 ng/cm$^2$/hr.

BRIEF DESCRIPTION OF THE DRAWINGS

FIG. 1 is a transverse cross section through a lightweight insulation blanket of the present invention.

FIG. 2 is a transverse cross section through a lightweight insulation product of the present invention including a plurality of blankets in stacked relationship adhered to a film enveloping the stack of blankets on three sides.

FIG. 3 is a transverse cross section through a lightweight insulation product of the present invention including a plurality of blankets in stacked relationship adhered to film enveloping the stack of blankets on two sides.

FIG. 4 is a partial schematic perspective view of the lightweight insulation product of the present invention encased in an outer film and attached to the skin of an aircraft fuselage.

DESCRIPTION OF THE PREFERRED EMBODIMENTS

The lightweight insulation product of the present invention includes an air laid blanket 20 of randomly oriented entangled glass fibers bonded together by a thermosetting binder (preferably a phenolic binder). The glass fibers of the blanket have a mean diameter of about 1+/−0.25 microns. The blanket has a density between about 0.25 and about 1.5 pounds per cubic foot and a thickness between about 0.35 inches and about 2.0 inches. Typically, the blanket 20 has a binder content of about 10+/−3.5 weight percent as measured by the percentage of weight loss incurred by the blanket when the binder is burned off (%LOI). The blanket, exclusive of anything else, has an average machine direction tensile strength of at least 0.6 pounds/inch of blanket width and an average cross machine direction tensile strength of at least 0.3 pounds/inch of blanket length; a transverse airflow resistance between about 300 Rayls and about 1800 Rayls; and a thermal conductivity equal to or less than about 0.32 BTU-in/hr-ft$^2$-° F. In addition to the above, the glass fibers of the blanket have a biodissolution rate in excess of 150 ng/cm$^2$/hr, preferably equal to or greater than 200 ng/cm$^2$/hr, more preferably equal to or greater than 300 ng/cm$^2$/hr, and most preferably equal to or greater than 400 ng/cm$^2$/hr.

Three of the preferred embodiments of the lightweight insulation product of the present invention are the 0.34 pcf×1"; 0.5 pcf×1"; and 1.2 pcf×⅜" lightweight insulation products. In the 0.34 nominal pcf product, the blanket 20 has a density between about 0.31 and about 0.37 pounds/ft$^3$; the thermosetting binder is a phenolic binder; the blanket has a thermal conductivity equal to or less than about 0.31 BTU-in/hr-ft$^2$-° F. and preferably, equal to or less than about 0.29 BTU-in/hr-ft$^2$-° F.; the blanket has a transverse airflow resistance between about 300 and about 500 Rayls; and the glass fibers have a biodissolution rate in excess of 150 ng/cm$^2$/hr, preferably equal to or greater than 200 ng/cm$^2$/hr, more preferably equal to or greater than 300 ng/cm$^2$/hr, and most preferably equal to or greater than 400 ng/cm$^2$/hr. In the 0.5 nominal pcf product, the blanket 20 has a density between about 0.45 and about 0.55 pounds/ft$^3$; the thermosetting binder is a phenolic binder; the blanket has a thermal conductivity equal to or less than about 0.28 BTU-in/hr-ft$^2$-° F. and preferably, equal to less than about 0.26 BTU-in/hr-ft$_2$-° F.; the blanket has a transverse airflow resistance between about 1200 and about 1600 Rayls; and the glass fibers have a biodissolution rate in excess of 150 ng/cm$^2$/hr, preferably equal to or greater than 200 ng/cm$^2$/hr, more preferably equal to or greater than 300 ng/cm$^2$/hr, and most preferably equal to or greater than 400 ng/cm$^2$/hr. In the 1.2 nominal pcf product, the blanket 20 has a density between about 1.1 and about 1.3 pounds/ft$^3$; the thermosetting binder is a phenolic binder; the blanket has a thermal conductivity equal to or less than about 0.225 BTU-in/hr-ft$^2$-° F.; the blanket has a transverse airflow resistance between about 1500 and about 1800 Rayls; and the glass fibers have a biodissolution rate in excess of 150 ng/cm$^2$/hr, preferably equal to or greater than 200 ng/cm$^2$/hr, more preferably equal to or greater than 300 ng/cm$^2$/hr, and most preferably equal to or greater than 400 ng/cm$^2$/hr.

Unlike previous lightweight insulations used for aircraft applications, the lightest of the air laid blankets 20 of the present invention do not require a woven or nonwoven backing (such as porous nonwoven backings marketed under the trademark REMAY) to provide the blanket with the necessary machine and cross machine tensile strengths for good product production efficiencies and to meet or exceed required aircraft manufacturer tensile strength specifications. For example, blankets used in prior 0.34 nominal pcf×1" lightweight insulation products exhibited average tensile strengths in the machine direction of 0.35 pounds per inch of blanket width and average tensile strengths in the cross machine direction of 0.15 pounds per inch of blanket length. The required aircraft manufacturer tensile strength specifications for lightweight insulation products are an average tensile strength in the machine direction of at least 0.6 pounds per inch of blanket width and an average tensile strength in the cross machine direction of at least 0.3 pounds per inch of blanket length. Accordingly, the prior insulation blankets required a backing sheet to meet the required tensile strengths.

The 0.34 nominal pcf×1" lightweight insulation blankets 20 of the present invention have a minimum average tensile strength in the machine direction of at least 0.6 pounds per inch of blanket width and a minimum average tensile strength in the cross machine direction of at least 0.3 pounds per inch of blanket length and, when tested, exhibited average tensile strengths in the machine direction of 1.22 pounds per inch of blanket width and in the cross machine direction of 0.33 pounds per inch of blanket length. The 0.5 nominal pcf×1" lightweight insulation blankets 20 of the present invention have a minimum average tensile strength in the machine direction of at least 1.0 pounds per inch of blanket width and a minimum average tensile strength in the cross machine direction of at least 0.4 pounds per inch of blanket length. The 1.2 nominal pcf×⅜" lightweight insulation blankets of the present invention have a minimum average tensile strength in the machine direction of at least 1.5 pounds per inch of blanket width and a minimum average tensile strength in the cross machine direction of at least 0.8 pounds per inch of blanket length.

Blankets 20 of the 0.34 nominal pcf×1", 0.5 nominal pcf×1"; and 1.2 nominal pcf×⅜" lightweight insulation products also exhibit, for comparable densities, higher transverse airflow resistances than the blankets used in the prior lightweight insulation products discussed above. Higher airflow resistances enable the blankets 20 of the present invention to better reduce sound transmission through the blankets.

Blankets 20 of the 0.34 nominal pcf×1", 0.5 nominal pcf×1"; and 1.2 nominal pcf×⅜" lightweight insulation products also exhibit, for comparable density products, lower thermal conductivities than the prior lightweight insulation products with nonwoven facings discussed above. For example, a 0.34 nominal pcf×1" blanket 20 of the present invention had a thermal conductivity of 0.287 BTU-in/hr-ft$^2$-° F. while comparable prior lightweight insulation products with nonwoven facings had a thermal conductivity of 0.310 BTU-in/hr-ft$^2$-° F. A 0.5 nominal pcf×1" blanket 20 of the present invention had a thermal conductivity of 0.255 BTU-in/hr-ft$^2$-° F. while comparable prior lightweight insulation products with nonwoven facings had a thermal conductivity of 0.273 BTU-in/hr-ft$^2$-° F. A 1.2 nominal pcf×3/8" blanket 20 of the present invention had a thermal conductivity of 0.221 BTU-in/hr-ft$^2$-° F. while comparable prior lightweight insulation products with nonwoven facings had a thermal conductivity of 0.224 BTU-in/hr-ft$^2$-° F. It is believed that the replacement of the facing by an equal or substantially equal weight of glass fibers (e.g. 12 weight percent for the 0.34 nominal pcf products and 8 weight percent for the 0.5 nominal pcf products), plus the higher levels of boron in the preferred glass compositions used to form the glass fibers in the preferred embodiments of the present invention, both contribute to the lower thermal conductivities of the lightweight insulation products of the present invention.

The lower thermal conductivities of the lightweight insulation products of the present invention may enable lower weight glass fiber insulations for aircraft. For example, a lightweight insulation product of the present invention having a density of about 0.28 pcf exhibited thermal and acoustical properties equivalent to the prior 0.34 pcf faced lightweight insulation products. While the 0.28 pcf product has not been commercialized, the 0.28 pcf product, with its approximately 18% weight reduction, demonstrates the possible weight reductions which could be achieved with the present invention for certain applications.

FIG. 2 shows a plurality of blankets 20 layered and wrapped for installation in an aircraft fuselage. The blankets 20 are stacked with the major surfaces of the blankets in face to face relationship and wrapped in a film 22 that covers one major surface a blanket at a first end of the stack and the lateral edges of all of the blankets. The film 22 overlaps portions of the outer major surface of blanket at the second end of the stack and is secured to blanket at the second end of the stack by stitching, not shown, adhesive or heat sealing which is the preferred form of attachment. A major portion of the outer major surface of the blanket at the second end of the stack remain exposed so that moisture is not trapped within the stack.

FIG. 3 shows a plurality of blankets 20 layered and partially wrapped for installation in an aircraft fuselage. The blankets 20 are stacked with the major surfaces of the blankets in face to face relationship and partially wrapped in film 22 that cover the lateral edges of all of the blankets. The films 22 overlap portions of the outer major surfaces of blankets at the first and second ends of the stack and are secured to blankets at the first and second ends of the stack by stitching, not shown, adhesive or heat sealing which is the preferred form of attachment. Major portions of the outer major surfaces of the blankets at the first and second ends of the stack remain exposed so that moisture is not retained within the stack.

A typical installation of the lightweight insulation product of the present invention is shown in FIG. 4 wherein a number of unfaced blankets 20 have been stacked and encased in a film 22 which is heat sealed to the edge portions of a major surface of the blanket at one end of the stack leaving a major portion of the major surface of the blanket exposed so that moisture is not trapped within the stack. The film-encased lightweight insulation stack 24 is attached to the aircraft structure 26 by means of pins 28 which penetrate the blankets 20. The pins are secured to the structure by any suitable means, such as by welding, clamps or bolts.

While other glass compositions may be used to form glass fibers with the required physical properties for the lightweight glass fiber insulation of the present invention, one preferred glass composition which forms glass fibers having the required physical properties, in mol percent, is as follows:

| | | |
|---|---|---|
| | $SiO_2$ | 66–69.7 |
| | $Al_2O_3$ | 0–2.2 |
| | RO | 7–18 |
| | $R_2O$ | 9–20 |
| | $B_2O_3$ | 0–7.1 | where $R_2O$ is an alkali metal oxide and RO is an alkaline earth metal oxide. $R_2O$ is preferably $Na_2O$ in most substantial part, while RO may be MgO and/or CaO, preferably both, in a molar ratio of MgO/CaO of 1:3 to 3:1, more preferably 2:3 to 3:2. The chemical behavior of the glass is dictated by three ratios which the glass composition must meet, C(acid), C(bio), and C(moist). These ratios are defined compositionally as follows, all amounts being in mol percent:

$C(acid) = [SiO_2]/([Al_2O_3]+B_2O_3)+[R_2O]+[RO])$
$C(bio) = ([SiO_2]+[Al_2O_3])/B_2O_3]+[R_2O]+[RO])$
$C(moist) = ([SiO_2]+[Al_2O_3]+B_2O_3])/([R_2O]+[RO])$.

In these ratios, C(acid) is the ratio which pertains to chemical resistance in acid environments, C(bio) is the ratio which is most closely linked to biosolubility, and C(moist) is the ratio which relates to the retention of properties in moist environments. It is desired that C(acid) and C(moist) be as large as possible, while C(bio) should be as low as possible. At the same time, the HTV and liquidus of the overall composition must be suitable for glass fiber processing (preferably by a flame attenuation process). It has been found that glass fibers of high biosolubility made by flame attenuated processes maintain other necessary physical properties, such as chemical resistance and moisture resistance, when C(acid) is equal to or greater than 1.95, C(bio) is equal to or less than 2.30, and C(moist) is equal to or greater than 2.40.

Preferably, the biosoluble glass fibers used in the lightweight glass fiber insulations of the present invention, have a composition which falls within the following ranges (in mol percent):

| | | |
|---|---|---|
| | $SiO_2$ | 66–69.0 |
| | $Al_2O_3$ | 0–2.2 |
| | RO | 7–16 |
| | $R_2O$ | 9–19 |
| | $B_2O_3$ | 0–7.1 |

Most preferably, the biosoluble glass fibers used in the lightweight glass fiber insulations of the present invention, have a composition which falls within the following ranges (in mol percent):

| | | |
|---|---|---|
| | $SiO_2$ | 66–68.25 |
| | $Al_2O_3$ | 0–2.2 |
| | RO | 7–13 |
| | $R_2O$ | 11–18 |
| | $B_2O_3$ | 0–7.1 |

With respect to the performance characteristics of the glass fibers used in the lightweight glass fiber insulation of the present invention, it is preferred that C(acid) be greater than or equal to 2.00; C(bio) be less than or equal to 2.23, more preferably, less than or equal to 2.20; and that C(moist) be greater than or equal to 2.50, preferably greater than or equal to 2.60. As discussed previously, it is most desirable that C(acid) and C(moist) values be as high as possible. For example, C(moist) values of 3.00 or greater are particularly preferred. It should also be noted that the various C-ratios are independent in the sense that a more preferred glass need not have all "more preferred" C-ratios.

The acid resistance of the fibers may be measured by battery industry standard tests. For example, a typical test involves the addition of 5 grams of nominally 3 micron diameter fiber in 50 mL of sulfuric acid having a specific gravity of 1.26. Following refluxing for 3 hours, the acid phase may be separated by filtration and analyzed for dissolved metals or other elements.

The procedure used to evaluate biodissolution rate of the fibers is similar to that described in Law et al. (1990). The procedure consists essentially of leaching a 0.5 gram aliquant of the candidate fibers in a synthetic physiological fluid, known as Gamble's fluid, or synthetic extracellular fluid (SEF) at a temperature of 37° C. and rate adjusted to achieve a ratio of flow rate to fiber surface area of 0.02 cm/hr to 0.04 cm/hr for a period of up to 1,000 hours duration. Fibers are held in a thin layer between 0.2 micron polycarbonate filter media backed by plastic support mesh and the entire assembly placed within a polycarbonate sample cell through which the fluid may be percolated. Fluid pH is regulated to 7.4 +0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant can be calculated for each fiber type from the relation:

$$k = \{d_0(1-(M/M_0)^{0.5})/2t$$

where: k is the dissolution rate constant in SEF, $d_0$ the initial fiber diameter, the initial density of the glass comprising the fiber, No the initial mass of the fibers, M the final mass of the fibers ($M/M_0$=the mass fraction remaining), and t the time over which the data was taken. Details of the derivation of this relation is given in Leinweber (1982) and Potter and Mattson (1991). Values for k may be reported in $ng/cm^2/hr$ and preferably exceed a value of 150. Replicate runs on several fibers in a given sample set show that k values are consistent to within 3 percent for a given composition.

Data obtained from the above outlined evaluation can be effectively correlated within the sample set chosen. While the mean fiber diameter of the fibers used in the lightweight insulation products of the present invention is about 1+/− 0.25 microns, dissolution data used to derive k values for the glass fibers used in the lightweight glass fiber insulations of the present invention were obtained only from experimental samples of uniform 3.0 micron diameter and under identical conditions on initial sample surface area per volume of fluid per unit time, and sample permeability. Data was obtained from runs of up to 30 days to obtain an accurate representation of the long term dissolution of the fibers. From these evaluations, the preferred biodissolution rate constants k (in $ng/cm^2/hr$) for glass fibers used in the lightweight glass fiber insulations of the present invention are greater than 150 $ng/cm^2/hr$, preferably equal to or greater than 200 $ng/cm^2/hr$, more preferably equal to or greater than 300 $ng/cm^2/hr$, and most preferably equal to or greater than 400 $ng/cm^2/hr$.

To the determine moisture resistance of the glass fibers, a stress corrosion test is used in which fibers are stressed by bending the fibers in a controlled humidity and temperature test chamber. Fibers which exhibit moisture resistance under these conditions take longer to break.

With respect to the preferred glass compositions used to form the glass fibers used in the insulation product of the present invention, by the term "consisting essentially of" is meant that additional ingredients may be added to the composition provided the additional ingredients do not substantially alter the nature of the composition. Substances which cause the biodissolution rate to drop below 150 $ng/cm^2/hr$ or which make the composition unsuitable for forming fibers having a mean of diameter of 1+/−0.25 microns and a biodissolution rate in excess of 150 $ng/cm^2/hr$ by a flame attenuation process are substances which do substantially alter the composition. As used herein the term "flame attenuation process" refers to a fiberization process wherein the final attenuation step of the process involves the introduction of the glass fibers directly into a hot, high velocity burner flame. In many processes, typically rotary fiberization processes, the final attenuation step of the process involves the introduction of the glass fibers into high velocity combustion gases which are relatively cool when compared to the temperatures of the flames used in the flame attenuation processes. When used in flame attenuation processes, glass compositions used in other than flame attenuation processes to form fibers having biodissolution rates in excess of 150 $ng/cm^2/hr$, in general, do not form fibers having biodissolution rates in excess of 150 $ng/cm^2/hr$. Since the preferred method of forming the glass fibers used in the preferred lightweight insulation product of the present invention is by means of a flame attenuation process, glass compositions which can form fibers of the required diameter with the required biodissolution rate of 150 $ng/cm^2/hr$ in a flame attenuation process are preferred. While the reverse is not generally true, the preferred glass compositions of the present invention, which can form fibers of the required diameter with the required biodissolution rate of 150 $ng/cm^2/hr$ in a flame attenuation process, can be used to form fibers with the required biodissolution rate in the rotary fiberization processes mentioned above. Preferably, the glass compositions are free of iron oxides, lead oxides, fluorine, phosphates ($P_2O_5$), zirconia, and other expensive oxides, except as unavoidable impurities.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An insulation product for use as an aircraft insulation, comprising:

a fibrous air laid blanket of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | the glass composition having a C(acid)≧1.95, a C(bio) ≦2.30, and a C(moist)≧2.40; the glass fibers have a biodissolution rate in excess of 150 $ng/cm^2/hr$; the blanket having a density between about 0.25 and about 0.37 pounds per cubic foot and a thickness between about 0.35 inches and about 2.0 inches; and the blanket, exclusive of anything else, having an average machine direction tensile strength of at least 0.6 pounds/inch of blanket width and an average cross machine direction tensile strength of at least 0.3 pounds/inch per inch of blanket length.

2. The insulation product according to claim 1, wherein: the blanket having a transverse airflow resistance between about 300 Rayls and about 500 Rayls.

3. The insulation product according to claim 1, wherein: the blanket has a thermal conductivity equal to or less than about 0.31 BTU-in/hr-$ft^2$-° F.

4. The insulation product according to claim 1, wherein: the blanket having a transverse airflow resistance between about 300 Rayls and about 500 Rayls; and the blanket has a thermal conductivity equal to or less than about 0.31 BTU-in/hr-ft$^2$-° F.

5. The insulation product according to claim 4, wherein: the glass fibers of the blanket have a biodissolution rate of about 300 ng/cm$^2$/hr or greater.

6. The insulation product according to claim 4, wherein: the glass fibers of the blanket have a biodissolution rate of about 400 ng/cm$^2$/hr or greater.

7. The insulation product according to claim 1, wherein: the glass fibers of the blanket have a biodissolution rate of about 300 ng/cm$^2$/hr or greater.

8. The insulation product according to claim 1, wherein: the glass fibers of the blanket have a biodissolution rate of about 400 ng/cm$^2$/hr or greater.

9. An insulation product for use as an aircraft insulation, comprising:

a fibrous air laid blanket of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | the glass composition having a C(acid)≧1.95, a C(bio) ≦2.30, and a C(moist)≧2.40; the glass fibers have a biodissolution rate in excess of 150 ng/cm$^2$/hr; the blanket having a density between about 0.45 and about 0.55 pounds per cubic foot and a thickness between about 0.35 inches and about 2.0 inches; and the blanket, exclusive of anything else, having an average machine direction tensile strength of at least 1.0 pounds/inch of blanket width and an average cross machine direction tensile strength of at least 0.4 pounds/inch of blanket length.

10. The insulation product according to claim 9, wherein: the blanket having a transverse airflow resistance between about 1200 Rayls and about 1600 Rayls.

11. The insulation product according to claim 9, wherein: the blanket has a thermal conductivity equal to or less than about 0.28 BTU-in/hr-ft$^2$-° F.

12. The insulation product according to claim 9, wherein: the glass fibers of the blanket have a biodissolution rate of about 300 ng/cm$^2$/hr or greater.

13. An insulation product for use as an aircraft insulation, comprising:

a fibrous air laid blanket of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | the glass composition having a C(acid)≧1.95, a C(bio) ≦2.30, and a C(moist)≧2.40; the glass fibers have a biodissolution rate in excess of 150 ng/cm$^2$/hr; the blanket having a density between about 1.1 and about 1.3 pounds per cubic foot and a thickness between about 0.35 inches and about 2.0 inches; and the blanket, exclusive of anything else, having an average machine direction tensile strength of at least 1.5 pounds/inch of blanket width and an average cross machine direction tensile strength of at least 0.8 pounds/inch of blanket length.

14. The insulation product according to claim 13, wherein: the blanket having a transverse airflow resistance between about 1500 Rayls and about 1800 Rayls.

15. The insulation product according to claim 13, wherein: the blanket has a thermal conductivity equal to or less than about 0.225 BTU-in/hr-ft$^2$-° F.

16. The insulation product according to claim 13, wherein: the glass fibers of the blanket have a biodissolution rate of about 300 ng/cm$^2$/hr or greater.

17. An insulation product for use as an aircraft insulation, comprising:

a fibrous air laid blanket of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | the glass composition having a C(acid)≧1.95, a C(bio) ≦2.30, and a C(moist)≧2.40; the glass fibers having a biodissolution rate in excess of 150 ng/cm$^2$/hr; the blanket having a density between about 0.25 and about 1.5 pounds per cubic foot and a thickness between about 0.35 inches and about 2.0 inches; the blanket, exclusive of anything else, having an average machine direction tensile strength of at least 0.6 pounds/inch and an average cross machine direction tensile strength of at least 0.3 pounds/inch; and the blanket having a transverse airflow resistance between about 300 Rayls and about 1800 Rayls.

18. The insulation product according to claim 17, wherein: the blanket has a thermal conductivity equal to or less than about 0.32 BTU-in/hr-ft$^2$-° F.

19. An insulation product for use as aircraft insulation, comprising:

a plurality of fibrous air laid blankets of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| SiO₂ | 66–69.7 |
| Al₂O₃ | 0–2.2 |
| RO | 7–18 |
| R₂O | 9–20 |
| B₂O₃ | 0–7.1 | the glass composition having a C(acid)≧1.95, a C(bio) ≦2.30, and a C(moist)≧2.40; the glass fibers have a biodissolution rate in excess of 150 ng/cm²/hr; the blankets each having major surfaces; the blankets being stacked with the major surfaces of the blankets in face to face relationship; each of the blankets having a density between about 0.25 and about 0.37 pounds per cubic foot and a thickness between about 0.35 inches and about 2.0 inches; each of the blankets exclusive of anything else having an average machine direction tensile strength of at least 0.6 pounds/inch and an average cross machine direction tensile strength of at least 0.3 pounds/inch; and the plurality of stacked blankets being held together by a film adhered to the stacked blankets.

20. The insulation product according to claim 19, wherein: each of the blankets having a transverse airflow resistance between about 300 Rayls and about 500 Rayls; and each of the blankets has a thermal conductivity equal to or less than about 0.31 BTU-in/hr-ft²-° F.

21. The insulation product according to claim 20, wherein: the glass fibers of each of the blankets have a biodissolution rate of about 300 ng/cm²/hr or greater.

22. The insulation product according to claim 20, wherein: the glass fibers of each of the blankets have a biodissolution rate of about 400 ng/cm²/hr or greater.

23. The insulation product according to claim 19, wherein: the glass fibers have a biodissolution rate of about 300 ng/cm²/hr or greater.

24. The insulation product according to claim 19, wherein: the glass fibers have a biodissolution rate of about 400 ng/cm²/hr or greater.

25. An insulation product for use as aircraft insulation, comprising:

a plurality of fibrous air laid blankets of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| SiO₂ | 66–69.7 |
| Al₂O₃ | 0–2.2 |
| RO | 7–18 |
| R₂O | 9–20 |
| B₂O₃ | 0–7.1 | the glass composition having a C(acid)≧1.95, a C(bio) ≦2.30, and a C(moist)≧2.40; the glass fibers have a biodissolution rate in excess of 150 ng/cm²/hr; the blankets each having major surfaces; the blankets being stacked with the major surfaces of the blankets in face to face relationship; each of the blankets having a density between about 0.45 and about 0.55 pounds per cubic foot and a thickness between about 0.35 inches and about 2.0 inches; each of the blankets exclusive of anything else having an average machine direction tensile strength of at least 1.0 pounds/inch of blanket width and an average cross machine direction tensile strength of at least 0.4 pounds/inch of blanket length; and the plurality of stacked blankets being held together by a film adhered to the stacked blankets.

26. The insulation product according to claim 25, wherein: each of the blankets having a transverse airflow resistance between about 1200 Rayls and about 1600 Rayls; and each of the blankets has a thermal conductivity equal to or less than about 0.28 BTU-in/hr-ft²-° F.

27. An insulation product for use as aircraft insulation, comprising:

a plurality of fibrous air laid blankets of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| SiO₂ | 66–69.7 |
| Al₂O₃ | 0–2.2 |
| RO | 7–18 |
| R₂O | 9–20 |
| B₂O₃ | 0–7.1 | the glass composition having a C(acid)≧1.95, a C(bio) ≦2.30, and a C(moist)≧2.40; the glass fibers have a biodissolution rate in excess of 150 ng/cm²/hr; the blankets each having major surfaces; the blankets being stacked with the major surfaces of the blankets in face to face relationship; each of the blankets having a density between about 1.1 and about 1.3 pounds per cubic foot and a thickness between about 0.35 inches and about 2.0 inches; each of the blankets exclusive of anything else having an average machine direction tensile strength of at least 1.5 pounds/inch of blanket width and an average cross machine direction tensile strength of at least 0.8 pounds/inch of blanket length; and the plurality of stacked blankets being held together by a film adhered to the stacked blankets.

28. The insulation product according to claim 27, wherein: each of the blankets having a transverse airflow resistance between about 1500 Rayls and about 1800 Rayls; and each of the blankets has a thermal conductivity equal to or less than about 0.225 BTU-in/hr-ft²-° F.

29. An insulation product for use as aircraft insulation, comprising:

a plurality of fibrous air laid blankets of randomly oriented, entangled, flame attenuated glass fibers bonded together by a thermosetting binder and having a mean diameter of about 1+/−0.25 microns; the glass fibers being made from a glass composition consisting essentially of, in mol percent:

| | |
|---|---|
| SiO₂ | 66–69.7 |
| Al₂O₃ | 0–2.2 |
| RO | 7–18 |
| R₂O | 9–20 |
| B₂O₃ | 0–7.1 | the glass composition having a C(acid)≧1.95, a C(bio) ≦2.30, and a C(moist)≧2.40; the glass fibers have a biodissolution rate in excess of 150 ng/cm²/hr; the blankets each having major surfaces; the blankets being stacked with the major surfaces of the blankets in face to face relationship; each of the blankets having a density between about 0.25 and about 1.5 pounds per cubic foot and a thickness between about 0.35 inches and about 2.0 inches; each of the blankets exclusive of anything else having an average machine direction tensile strength of at least 0.6 pounds/inch of blanket width and an average cross machine direction tensile strength of at least 0.3 pounds/inch of blanket length; and each of the blankets having a transverse airflow resistance between about 300 Rayls and about 1800 Rayls; and the plurality of stacked blankets being held together by a film adhered to the stacked blankets.

30. The insulation product according to claim 29, wherein: each of the blankets has a thermal conductivity equal to or less than about 0.32 BTU-in/hr-ft$^2$-° F.

* * * * *